(12) United States Patent
Sullivan (10) Patent No.: US 7,621,144 B1
(45) Date of Patent: Nov. 24, 2009

(54) CONSOLE COOLER

(76) Inventor: Thomas Sullivan, 250 S. Fernando Blvd., Apt. 121, Burbank, CA (US) 91502

( * ) Notice: Subject to any disclaimer, the term of this patent is extended or adjusted under 35 U.S.C. 154(b) by 271 days.

(21) Appl. No.: 11/809,591

(22) Filed: Jun. 1, 2007

(51) Int. Cl.
*F25D 23/12* (2006.01)
(52) U.S. Cl. .................................... 62/259.2
(58) Field of Classification Search ............... 62/259.2; 361/688
See application file for complete search history.

(56) References Cited

U.S. PATENT DOCUMENTS

| | | |
|---|---|---|
| 5,069,041 A | 12/1991 | Thielman et al. |
| 5,349,823 A | 9/1994 | Solomon |
| D362,843 S | 10/1995 | Alfonso et al. |
| 5,963,425 A | 10/1999 | Chrysler et al. |
| 6,453,378 B1 | 9/2002 | Olson et al. |
| 6,493,223 B1 | 12/2002 | Viswanath et al. |

*Primary Examiner*—Melvin Jones
(74) *Attorney, Agent, or Firm*—Kyle Fletcher (57) ABSTRACT

The present invention relates to one of two embodiments, which provide a refrigeration jacket that can be placed over or surround electronic equipment, such as the tower of a personal computer, a plasma television, or a video game console. The primary embodiment of the invention comprises an extendable jacket or cabinet that has a plurality of cooling coils running throughout the jacket or cabinet. The invention also requires a refrigeration compressor and condenser, an electrical cord, and a closing means. When in use, the cooling coils refrigerate the surrounding air, which in turn cools the electronic item in use. The result is an electronic item that can run for pro-longed periods of time as well as higher speeds due to the removal of heat associated with the computer's processor. Other embodiments include a computer game console embodiment, a plasma television embodiment, and a non-expandable computer console embodiment.

8 Claims, 6 Drawing Sheets

CONSOLE COOLER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of portable refrigerant devices used for cooling electronic equipment, more specifically, the tower of a personal computer or a video game console.

B. Discussion of the Prior Art

The Olson et al. Patent (U.S. Pat. No. 6,453,378) discloses a lab-top with an integrated refrigeration unit. However, this patent is directed to the use of refrigeration of lab-tops, as opposed to the less portable personal computer. Furthermore, this patent utilizes a refrigeration unit that is permanently affixed to a portable computer, and is thus not portably available for use with many different personal computers that are not portable.

The Solomon Patent (U.S. Pat. No. 5,349,823) discloses an integrated computer module that has a chip carrier assembly attached to a cryogenic cooler. However, the refrigeration unit in this Patent is directed to provide refrigerated air to a microchip, as opposed to a refrigeration jacket that is designed to fit over the tower of a personal computer.

The Chrysler et al. Patent (U.S. Pat. No. 5,963,425) discloses a cabinet with air inlet and exhaust openings including one or more air-moving devices for the air cooling of circuit cards contained within the cabinet. However, the device disclosed in this patent does not utilize a refrigeration cycle for cooling all of the components contained inside of the tower of a personal computer.

The Viswanath et al. Patent (U.S. Pat. No. 6,493,223) discloses a computer with a refrigeration means of cooling. However, the computer disclosed in this patent has a permanently affixed refrigeration cycle, as opposed to a portable refrigeration jacket that can be easily removed from the tower of one personal computer, and thereupon placed over the tower of a different personal computer.

The Thielman et al. Patent (U.S. Pat. No. 5,069,041) discloses an apparatus for electromechanical air conditioning of industrial electronics. However, the electromechanical air conditioning cabinet disclosed in this patent is designed for use with industrial electronics, as opposed to a refrigeration jacket designed to be fitted over a personal computer tower.

The Alfonos et al. Patent (U.S. Pat. No. Des. 362,843) illustrates a design for a computer cabinet, and does not discuss or illustrate a refrigerated jacket fitting over the tower of a personal computer.

With all of the discussion surrounding the above-mentioned prior art, it is readily apparent that there is a need for a means of cooling electronic components associated with computers, more specifically, a refrigerated jacket that can be easily placed over and removed from the tower of a personal computer.

BRIEF SUMMARY OF THE INVENTION

The present invention relates to one of two embodiments, which provide a refrigeration jacket that can be placed over or surround electronic equipment, such as the tower of a personal computer, a plasma television, or a video game console. The primary embodiment of the invention comprises an extendable jacket or cabinet that has a plurality of cooling coils running throughout the jacket or cabinet. The invention also requires a refrigeration compressor and condenser, an electrical cord, and a closing means. When in use, the cooling coils refrigerate the surrounding air, which in turn cools the electronic item in use. The result is an electronic item that can run for pro-longed periods of time as well as higher speeds due to the removal of heat associated with the computer's processor. Other embodiments include a computer game console embodiment, a plasma television embodiment, and a non-expandable computer console embodiment.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Detailed reference will now be made to the preferred embodiment of the present invention, examples of which are illustrated in FIGS. 1-4. The personal computer tower cabinet embodiment 15 comprises a left cabinet piece 16, a corresponding right cabinet piece 17, a left locking clasp 18 that is permanently affixed to the left cabinet piece 16, and a right locking clasp 19 corresponds to the left locking clasp 18 and is permanently affixed to the right cabinet piece 17.

A bottom locking clasp 28 is shown without much detail, and is located on both the left cabinet piece 16 and right cabinet piece 17, and contains the same locking configuration as the locking clasp located on the top of the device.

It shall be noted that the right locking clasp 19 and left locking clasp 17 mentioned above, can be replaced and substituted with a zipper (not shown) or nylon loop and hook type fastening means (not shown) on both the upper portion as well as the lower portion of the preferred embodiment.

Figure 3:
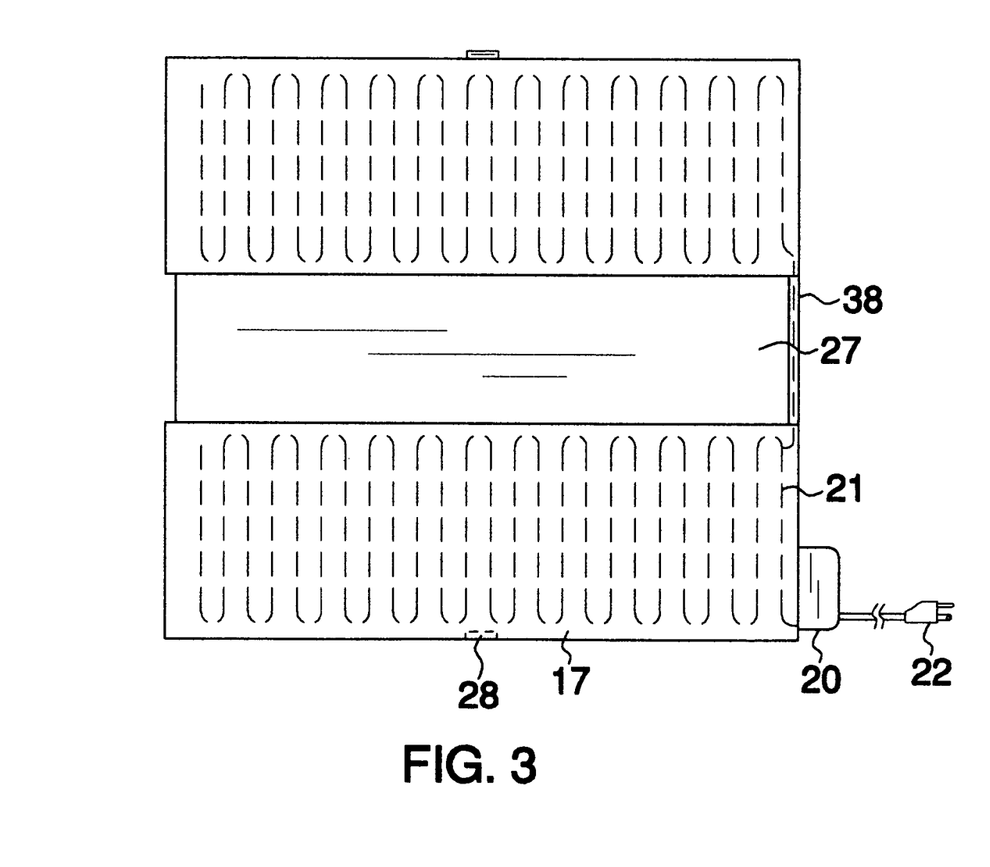
FIG. 3 illustrates a side view of the personal computer tower cabinet embodiment with the route of the refrigeration coils illustrated in imaginary lines.
Figure 4:
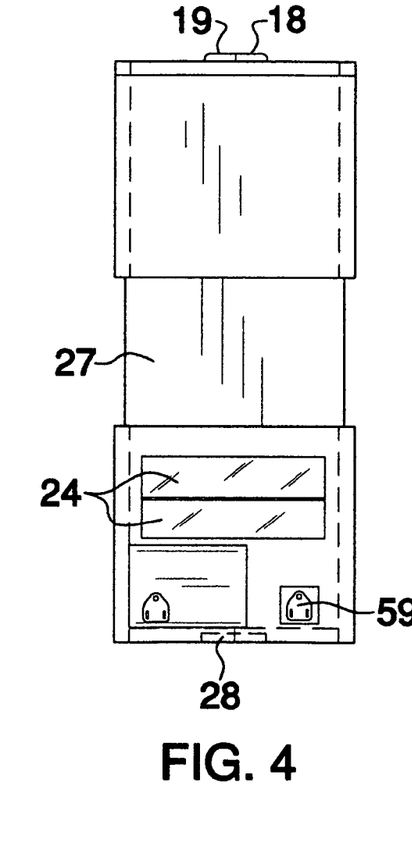
FIG. 4 illustrates a rear view of the personal computer tower cabinet in use over a personal computer tower.

Located on the rear side of the right cabinet piece 17 is a refrigeration condenser and compressor assembly 20, though not fully diagramed, which condenses and compresses the refrigerant through a refrigerant coil 21. The refrigerant coils 20 run throughout both the left cabinet piece 16 and right cabinet piece 17. As the condensed and compressed refrigerant at a low temperature passes through the refrigerant coil, heat from the surrounding air is removed and refrigerated.

It is further asserted that a portion of the refrigerant coil 20 is exposed (not shown) in order to make a continuous connection between the left cabinet piece 16 and right cabinet piece 17.

Figure 1:
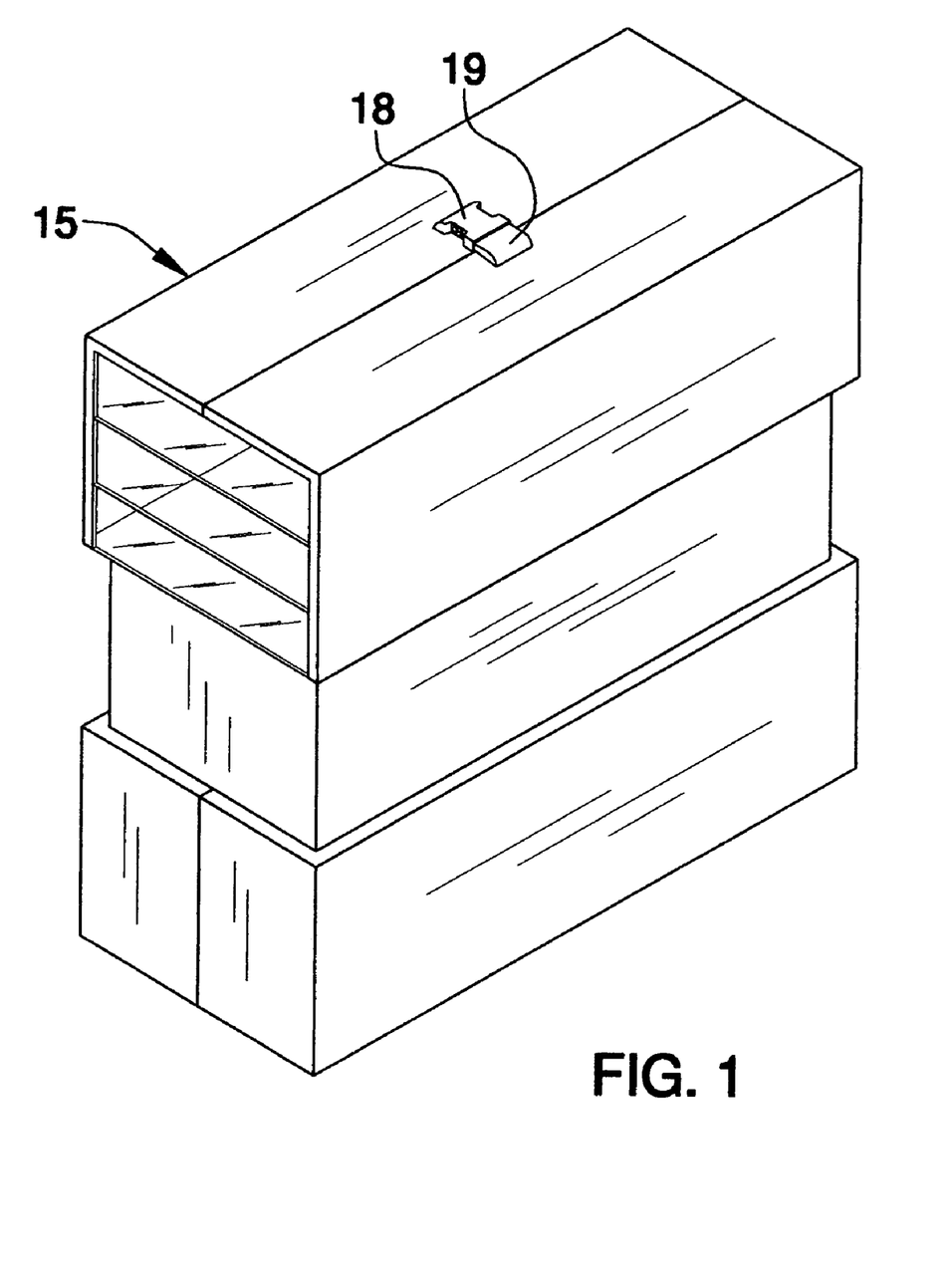
FIG. 1 illustrates an isometric view of the personal computer tower cabinet embodiment.
Figure 2:
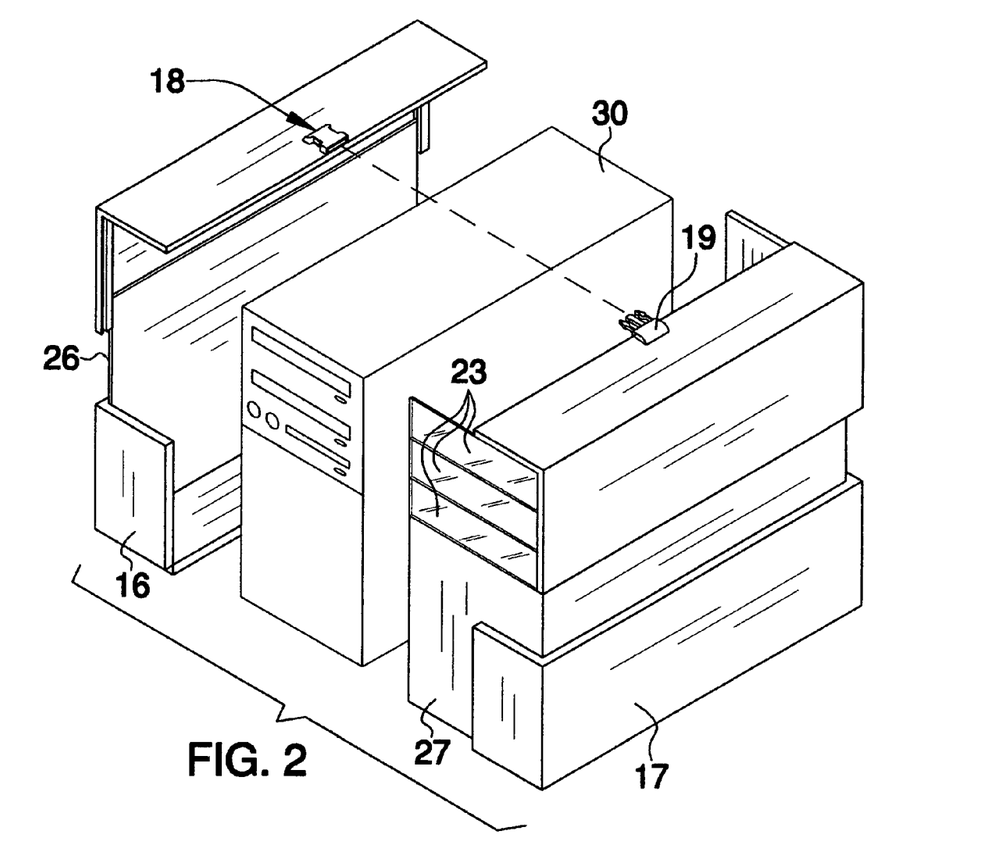
FIG. 2 illustrates an exploded view of the personal computer and the personal computer tower cabinet embodiment.

A plurality of transparent upper access panels 23 are located on upper front portions of the right cabinet piece 17. The upper access panels 23 are designed to enable the end user to depress or access various buttons or hardware features located on the front side of most personal computer towers 30. The upper access panels 23 are designed to flip open (not shown) in order for the end user to access the personal computer tower 30. An additional advantage of the upper access panels 23 is that they may be flipped down to the closed position in order to help contain the refrigerated air from escaping to the exterior surrounding environment.

A plurality of transparent lower access panels 24 are located on the lower rear portions of the right cabinet piece 17. The lower access panels 24 are designed to enable the end user have access to the various wiring that is required of most personal computer towers 30. The design of the lower access panels 24 is identical in function to the upper access panels 23.

The personal computer electrical cord opening 25 is designed to accommodate the electrical cord 31 of a personal computer tower 30. The unique design of the electrical cord opening 25 is to provide an additional feature of the personal computer tower embodiment 15, which is that the personal computer 30 can be continuously running during installation and removal of the personal computer tower embodiment 15.

The left cabinet piece 16 has a corresponding left extender piece 26, and the right cabinet piece 17 has a corresponding right extender piece 27. The left cabinet piece 16 has an upper portion and lower portion that are connected via the left extender piece 26. The right cabinet piece 17 has an upper portion and a lower portion that are connected via the right extender piece 27. The refrigerant coil 21 has an expandable portion 39 that raises and lowers to accommodate the extension of both the left and right extender pieces 26, and 27, respectively.

The integration of the left extender piece 26 and right extender piece 27 is designed to enable the overall height of the personal computer tower embodiment 15 be extended and reduced according to the overall height of the personal computer tower 30. The ability of the personal computer tower embodiment 15 to extend and reduce the overall height of the interior compartment is an added feature in that it provides flexibility in catering to personal computer towers of various dimensions, especially heights.

The personal computer tower embodiment 15 is used by placing a personal computer tower 30 between the left cabinet piece 16 and right cabinet piece 17. Thereupon, both the left cabinet piece 16 and right cabinet piece 17 can be closed together forming an interior compartment, which encapsulates the personal computer tower 30. The left locking clasp 18 and right locking clasp 19 are connected to create a secure connection thereby preventing the accidental separation of the left cabinet piece 16 and right cabinet piece 17.

Thereupon, an electrical cord 22 is plugged into a standard wall outlet, which in turn supplies electricity to the refrigeration condenser and compressor assembly 21, which in turn pumps refrigerated refrigerant throughout the refrigerant coils 20.

Figure 5:
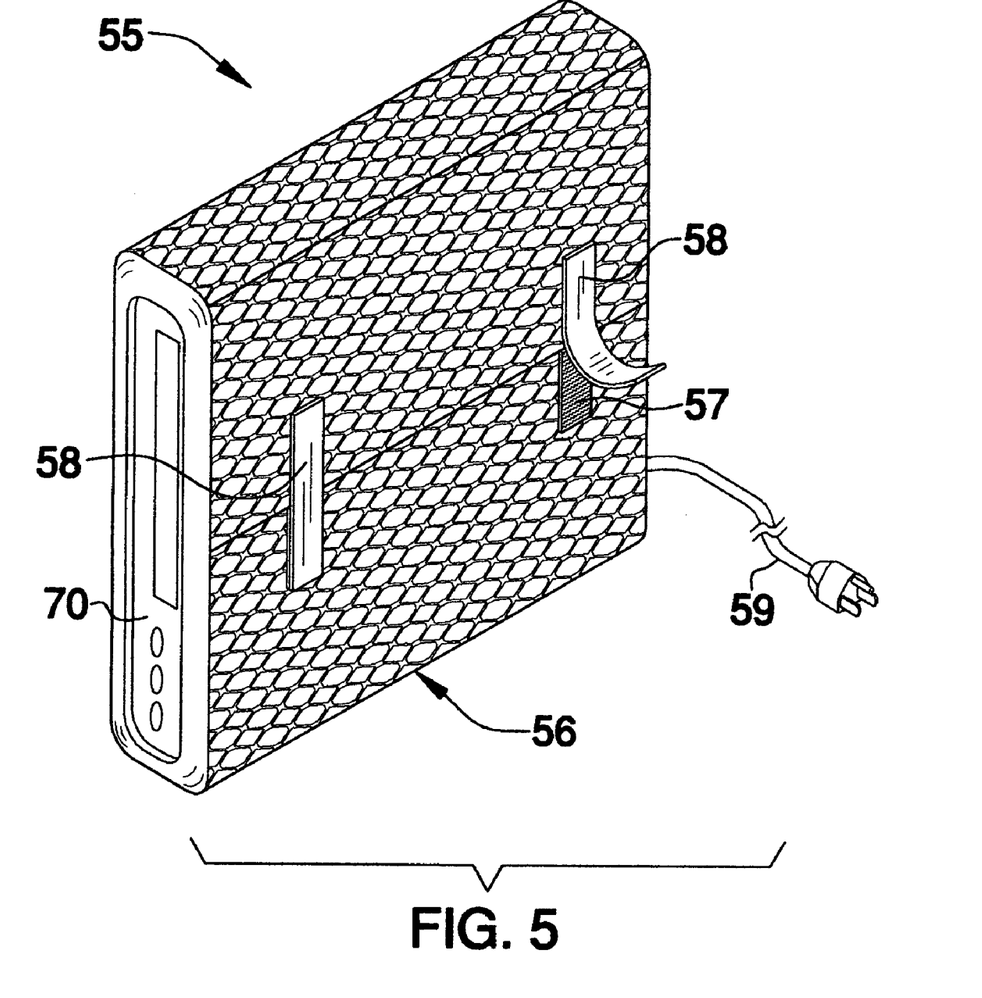
FIG. 5 illustrates an isometric view of the video game jacket embodiment.

Referring to FIG. 5, the video game console embodiment 55 comprises a flexible jacket 56 that has a refrigerant coil (not shown) running throughout the flexible jacket 56. The exterior surface of the flexible jacket 56 has a plurality of regions adorned with nylon loop material 57. Correspondingly, the other end of the exterior of the flexible jacket 56 has a corresponding number of nylon hook strips 58.

The video game console 55 has an electrical refrigeration condenser and compressor assembly (not shown), which circulates refrigerants that have been condensed and compressed. The refrigeration condenser and compressor (not shown) is powered by electricity, which is provided by an electrical cord 59. The electrical cord 59 plugs into any standard electrical outlet.

The video game console 55 is used by laying flat, exterior side face-down, the flexible jacket 56. Next, align and place a video game console 70 on top of the flexible jacket 56, and thereby wrap the flexible jacket 56 around the video game console 70, making sure that the nylon hook strips 58 align with the nylon loop regions 57.

A unique feature of the vide game console embodiment 55 is the design of the flexible jacket 56, which can be installed or removed while a vide game console 70 is operating. The video game console embodiment 55 provides refrigerated conditions to the area immediately surrounding the housing of the video game console 70 thereby removing heat generated by the processor of the video game console 70, which in turn yields a longer run time and higher operating speeds for the video game console 70.

Another unique feature of the video game console embodiment 55 is that the shape of the flexible jacket 56 enables the end user to access the front side of the hardware while the video game console 70 is in use. Additionally, the design of the flexible jacket 56 enables any electrical wiring, input or output wiring to be unobstructed while in use, which is a requirement to most video game consoles.

Figure 6:
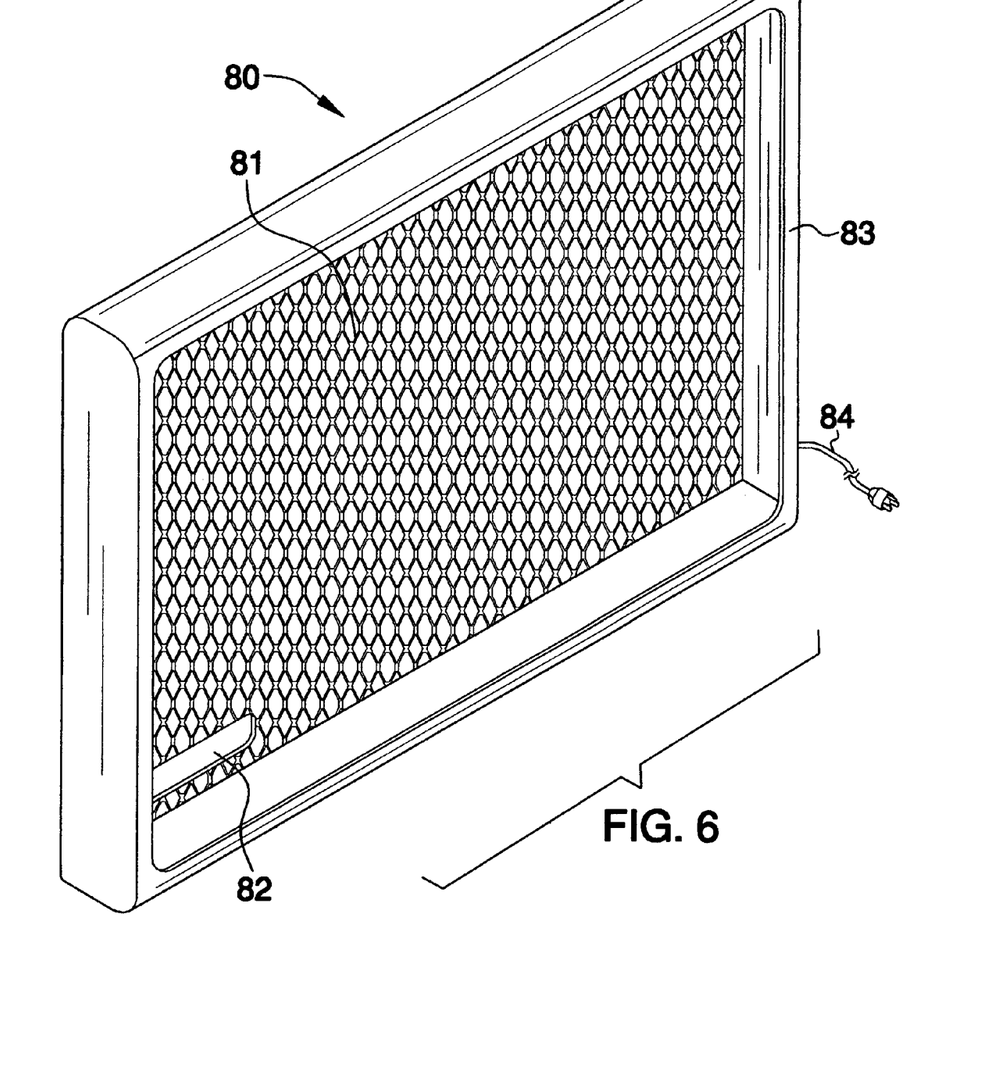
FIG. 6 illustrates a plasma television embodiment.

Referring to FIG. 6, the plasma television embodiment 80 (hereinafter plasma embodiment) includes an expandable mesh 81 along the rear side of the plasma embodiment and of which is the location of a refrigerant coils (not shown). An access opening 82 is located along the rear side so as to enable the various electrical cords to enter the plasma embodiment 80 for connection with a plasma television (not shown).

Located along the sides and a small portion of the front of the plasma embodiment 80 is a front frame 83 of which enables the plasma embodiment to be securely fit over a plasma television (not shown), and still enable the plasma television to be viewed without obstruction.

An electrical cord 84 is provided with the plasma embodiment along with the refrigeration means (not shown) that are required to produce a refrigeration.

Figure 7:
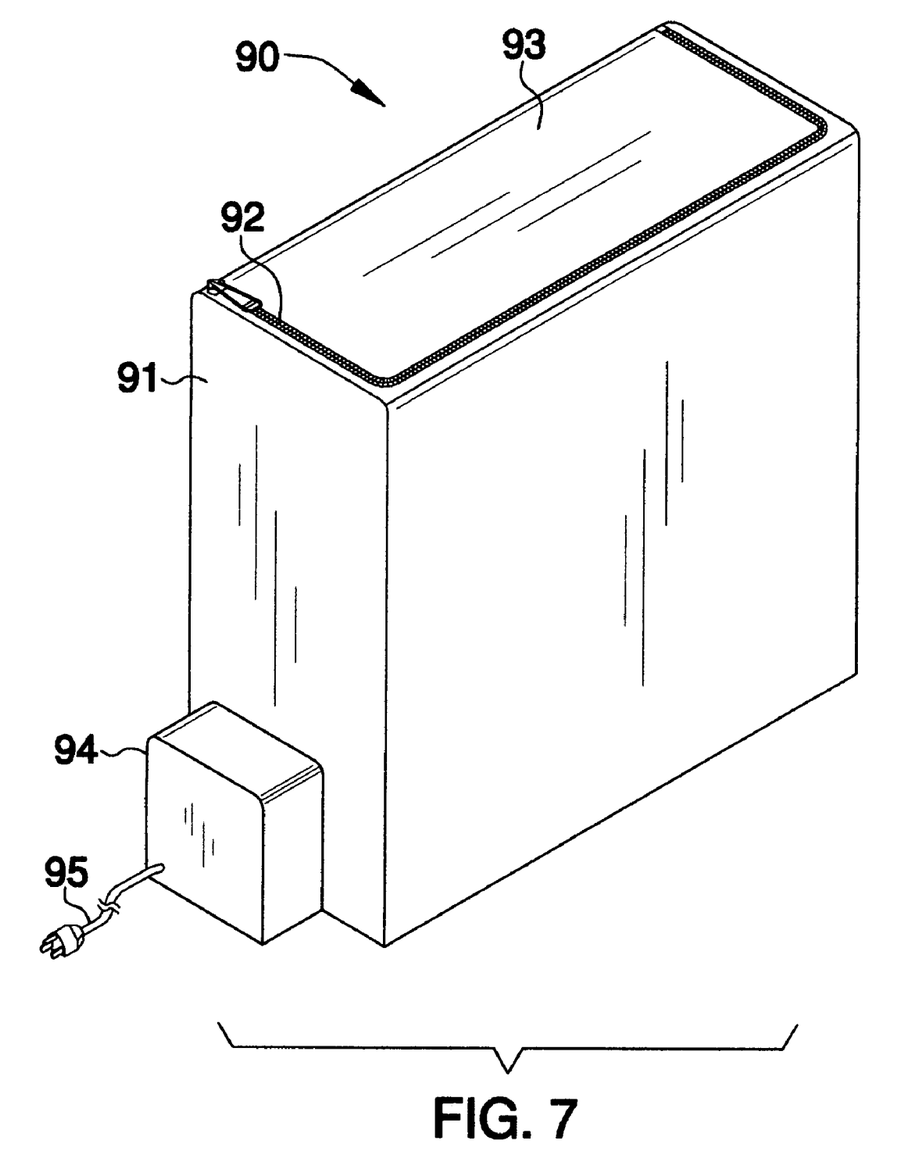
FIG. 7 illustrates a non-expandable computer console embodiment.

Referring to FIG. 7, the non-expandable computer console embodiment 90 (hereinafter non-expandable embodiment) includes a case 91, which has a zipper 92 along the top of which the top flap 92 can be opened (not depicted) in order to install or remove a computer console (not shown) within the non-expandable embodiment 90. It shall be noted that the dimensions of the case shall be roughly 54 cm high by 20.5 cm in width by 50.7 cm in length.

The non-expendable embodiment 90 has a refrigerant coil (not shown) that coils along the entire interior of the case 91, and is connected to a compressor and condenser, which are concealed within a component compartment 94 of the case 91. An electrical cord 95 exist the component compartment 94 and supplies electricity to the refrigeration components (not shown) that require electricity.

It is further asserted that for all of the above discussed embodiments that the exterior layer be made of an insulating material such that the refrigerated air surrounding the refrigerant coils be directed to the heat generated by the electrical components of the corresponding appliance of which each embodiment is so directed.

The invention claimed is:

1. A personal computer tower embodiment comprising:
   (a) a left cabinet piece;
      wherein a bottom side of a left extender piece fits within an interior of the lower left cabinet piece;
      wherein located at a predetermined position along the bottom side of the lower left cabinet piece is a left locking clasp;
      wherein located at a predetermined position along the top side of the left extender piece is a left locking clasp;
   (b) a right cabinet piece;
      wherein a bottom side of a right extender piece fits within the interior of the lower right cabinet piece;
      wherein located at a predetermined position along the bottom side of the lower right cabinet piece is a right locking clasp;
      wherein located at a predetermined position along the top side of the right extender piece is right locking clasp;
      wherein located at a predetermined position along the bottom rear of the lower right cabinet piece is a refrigeration condenser and compressor assembly, which provides condensed refrigerant under pressure to a refrigerant coil that runs throughout both the left cabinet piece and right cabinet piece;
      wherein the refrigeration condenser and compressor assembly is powered by an electrical cord that plugs into a standard wall outlet;
   wherein the bottom left locking clasp connects with the bottom right locking clasp in order to securely fasten the lower left cabinet piece to the lower right cabinet piece;
   wherein the top left locking clasp connects with the top right locking clasp in order to securely fasten the left extender piece to the right extender piece;
   wherein located at a predetermined location along the front top portion of either the right extender piece or the left extender piece are a plurality of transparent access flaps, which enable the end user to access various access ports of hardware located on the upper front side of a personal computer tower;
   wherein located at a predetermined location along the rear bottom portion of either the lower right cabinet piece or the lower left cabinet piece are a plurality of transparent access flaps, which enable an end user to connect various wires to the personal computer tower; and
   wherein located at a predetermined location along the bottom portion of either the lower right cabinet piece or the lower left cabinet piece is an electrical cord opening that provides ingress and egress of the personal computer tower electrical cord.

2. The personal computer tower embodiment of claim 1 wherein the left extender piece and right extender piece be made of an insulating material such that an refrigerated air surrounding the refrigerant coils be directed to the heat generated by an electrical components of the computer.

3. A video game console embodiment comprising:
   (a) a flexible jacket;
      wherein a refrigerant coil runs throughout the flexible jacket;
      wherein a plurality of nylon hook straps are placed on an end of the flexible jacket;
      wherein a corresponding plurality of nylon loop regions are adorned to the exterior surface of the flexible jacket such that when the flexible jacket is folded over the interior side, both the nylon hook straps will align with and fasten to the nylon loop regions thereby securing the flexible jacket;
   (b) an electrical refrigeration condenser and compressor is attached to the refrigerant coils and is supplied electrical power on which to operate by an electrical power cord; and
   wherein a vide game console is laid upon the flat interior surface of the flexible jacket; upon which the flexible jacket is thereupon wrapped around the video game console, and upon which the nylon hook straps are pressed against the nylon loop regions thereby securing the flexible jacket about the exterior of the video game console; upon which the electrical power cord is plugged into a standard wall outlet, upon which the electrical refrigeration condenser and compressor begins condensing and compressing the refrigerant about the refrigerant coil; and upon which the condensed and compressed refrigerant removes heat generated by the compressor of the video game console, and thereby reducing the heat and increasing the speed and period of operability of the video game console.

4. The vide game console embodiment of claim 3 wherein the exterior of the flexible jacket be made of an insulating material such that the refrigerated air surrounding the refrigerant coils be directed to the heat generated by the video game console.

5. A plasma television embodiment comprising:
   (a) an expandable mesh;
      wherein the expandable mesh runs along the rear side of the plasma television embodiment;
      wherein the location of a refrigerant coils is along the interior side of the expandable mesh;
      wherein an access opening is located along the rear side of the expandable mesh so as to enable an various electrical cords to enter the plasma television embodiment for connection with a plasma television;
   (b) a front framing section;
      wherein the front framing section is designed to securely fit over a the sides and a small portion of the front of a plasma television;
   (c) an electrical cord;
      upon which the electrical cord is plugged into a standard wall outlet, upon which an electrical refrigeration condenser and compressor begins condensing and compressing the refrigerant about the refrigerant coil; and upon which the condensed and compressed refrigerant removes heat generated by the electrical components of a plasma television.

6. The plasma television embodiment of claim 5 wherein the exterior of the expandable mesh be made of an insulating material such that the refrigerated air surrounding the refrigerant coils be directed to the heat generated by the plasma television.

7. A non-expandable computer console embodiment comprising:
   (a) a case 91;
      wherein the case has a zipper along the top of the case;
      wherein the zipper runs circumferentially along a top flap of the case that enables the case to be opened;

wherein the interior of the case has a refrigerant coil that coils along an entire interior of the case and is connected to a compressor and condenser;

wherein the compressor and condenser are contained in a component compartment that is connected to the case; and (b) an electrical cord;

upon which the electrical cord is plugged into a standard wall outlet, upon which the condenser and compressor begins condensing and compressing refrigerant about the refrigerant coil; and upon which the condensed and compressed refrigerant removes heat generated by an electrical components of a computer console.

8. The non-expandable computer console embodiment of claim 7 wherein the exterior of the case be made of an insulating material such that the refrigerated air surrounding the refrigerant coils be directed to the heat generated by the computer console.

* * * * *